United States Patent
Tran et al.

(10) Patent No.: US 11,112,132 B2
(45) Date of Patent: Sep. 7, 2021

(54) SYSTEMS AND METHODS FOR MONITORING WATER IN A BUILDING

(71) Applicants: Bao Tran, Saratoga, CA (US); Dave Nyhof, Shipshewana, IN (US)

(72) Inventors: Bao Tran, Saratoga, CA (US); Dave Nyhof, Shipshewana, IN (US)

(73) Assignee: Bao Tran, Saratoga, CA (US)

( * ) Notice: Subject to any disclaimer, the term of this patent is extended or adjusted under 35 U.S.C. 154(b) by 382 days.

(21) Appl. No.: 16/355,453

(22) Filed: Mar. 15, 2019

(65) Prior Publication Data

US 2020/0088602 A1 Mar. 19, 2020

Related U.S. Application Data

(60) Provisional application No. 62/804,755, filed on Feb. 13, 2019, provisional application No. 62/802,910, (Continued)

(51) Int. Cl.
| | |
|---|---|
| *F24F 11/00* | (2018.01) |
| *G05B 13/02* | (2006.01) |
| *G06F 21/60* | (2013.01) |
| *G06Q 20/06* | (2012.01) |
| *H04L 9/32* | (2006.01) |
| *H04L 29/06* | (2006.01) |
| *E03B 7/07* | (2006.01) |
| *G01M 3/18* | (2006.01) |
| *F24F 8/10* | (2021.01) |
| *F24F 110/12* | (2018.01) |
| *F24F 140/40* | (2018.01) |

(Continued)

(52) U.S. Cl.
CPC .......... *F24F 11/0001* (2013.01); *E03B 7/071* (2013.01); *F24F 8/10* (2021.01); *G01M 3/184* (2013.01); *G05B 13/0265* (2013.01); *G06F 21/602* (2013.01); *G06Q 20/06* (2013.01); *H04L 9/3252* (2013.01); *H04L 63/0428* (2013.01); *F24F 2011/0002* (2013.01); *F24F 2110/12* (2018.01); *F24F 2110/22* (2018.01); *F24F 2110/52* (2018.01); *F24F 2110/66* (2018.01); *F24F 2110/70* (2018.01); *F24F 2140/40* (2018.01); *G06Q 2220/00* (2013.01); *H04L 2209/38* (2013.01); *H04L 2209/56* (2013.01)

(58) Field of Classification Search
CPC ...... F24F 11/0001; F24F 8/10; F24F 2140/40; F24F 2110/70; F24F 2110/22; F24F 2110/66; F24F 2110/12; F24F 2110/52; F24F 2011/0002; E03B 7/071; G01M 3/184; G05B 13/0265; G06F 21/602; G06Q 20/06; G06Q 2220/00; H04L 9/3252; H04L 63/0428; H04L 2209/38; H04L 2209/56
USPC .......................................................... 73/40
See application file for complete search history.

(56) References Cited

U.S. PATENT DOCUMENTS

| | | |
|---|---|---|
| 10,161,115 B2 | 12/2018 | Beger |
| 10,839,378 B1 * | 11/2020 | Srinivasan ........... G06Q 20/065 |

(Continued)

*Primary Examiner* — Nicholas R Taylor
*Assistant Examiner* — Chong G Kim
(74) *Attorney, Agent, or Firm* — PowerPatent; Bao Tran

(57) ABSTRACT

A system to characterize water in a building includes a processor; a water sensor coupled to the processor; a water valve coupled to the processor; an encryption module executed by the processor to secure water data; and a transceiver to communicate secured water data over a network to a remote processor.

19 Claims, 8 Drawing Sheets

Related U.S. Application Data filed on Feb. 8, 2019, provisional application No. 62/800,344, filed on Feb. 1, 2019, provisional application No. 62/800,334, filed on Feb. 1, 2019, provisional application No. 62/800,349, filed on Feb. 1, 2019, provisional application No. 62/768,078, filed on Nov. 15, 2018, provisional application No. 62/744,660, filed on Oct. 12, 2018, provisional application No. 62/720,986, filed on Aug. 22, 2018, provisional application No. 62/720,981, filed on Aug. 22, 2018, provisional application No. 62/720,989, filed on Aug. 22, 2018.

(51) Int. Cl.
*F24F 110/52* (2018.01)
*F24F 110/66* (2018.01)
*F24F 110/70* (2018.01)
*F24F 110/22* (2018.01)

(56) References Cited

U.S. PATENT DOCUMENTS

| | | | | |
|---|---|---|---|---|
| 2014/0238511 | A1* | 8/2014 | Klicpera | G08B 21/18 137/551 |
| 2015/0204701 | A1* | 7/2015 | Klicpera | G01M 3/00 137/624.11 |
| 2016/0163177 | A1* | 6/2016 | Klicpera | G08B 21/18 137/59 |
| 2018/0048485 | A1* | 2/2018 | Pelton | G05B 19/0428 |
| 2018/0127957 | A1* | 5/2018 | Enev | G01M 3/2815 |
| 2018/0220278 | A1* | 8/2018 | Tal | G06Q 20/065 |
| 2019/0258278 | A1* | 8/2019 | Zokaei | G08B 25/10 |
| 2019/0392468 | A1* | 12/2019 | Stanciu | G06Q 20/405 |
| 2020/0232194 | A1* | 7/2020 | Periaswamy | H04L 9/3239 |

\* cited by examiner

FIG. 4A

| |
|---|
| detect wake-up time in the daily activity patterns (201) |
| detect calling time in the daily activity patterns (202) |
| detect toilet-using time in the daily activity patterns by motion sensing and/or detecting toilet water consumption rate (203) |
| detect entertainment pattern (204) |
| detect bathing time in the daily activity patterns by detecting a high volume of water consumption rate and/or motion sensor (205) |
| detect cooking time or time in kitchen through water consumption in the kitchen (206) |
| detect room-to-room movement with motion sensors (207) |

FIG. 4B

| |
|---|
| acquire water flow data (304) |
| identify individual appliance fixture water consumption from the sensor data (306) |
| determine daily life activity patterns from the individual appliance or fixture water consumption (308) |
| sending a request for assistance when the pattern matches one or more predetermined conditions (310) |

SYSTEMS AND METHODS FOR MONITORING WATER IN A BUILDING

This application claims priority to Provisional Application Ser. No. 62/804,755 filed on 13 Feb. 2019, 62/802,910 filed on 8 Feb. 2019, 62/800,349 filed on 1 Feb. 2019, 62/800,344 filed on 1 Feb. 2019, 62/800,334 filed on 1 Feb. 2019, 62/768,078 filed on 15 Nov. 2018, 62/744,660 filed on 12 Oct. 2018, 62/720,989 filed on 22 Aug. 2018, 62/720,986 filed on 22 Aug. 2018, and 62/720,981 filed on 22 Aug. 2018, the content of which are incorporated by reference.

BACKGROUND

The present disclosure relates to a water supply system with cryptographically secure water control and usage analysis.

Providing sufficient water of appropriate quality and quantity has been one of the most important issues in human history. A modern water supply system consists of infrastructure that collects, treats, stores, and distributes water between water sources and consumers. The goal is to deliver water to consumers with appropriate quality, quantity and pressure. Typically, water is supplied at high pressure just before reaching a home or a building, and the water pressure is reduced before it is fed to pipes in the home for consumption.

Once inside, water can leak for various reasons, such as from mechanical pipe failure due to age or frozen pipes. There are many different ways that water can create a problem at home. Whether it be a flooding basement, a broken washing machine hose, a leaking roof/ceiling, or something else, the damages can be catastrophic. Conventionally, water leak sensors can be installed near certain water fixtures such as water heater, sinks, and tubs to detect leaks. These devices are activated when leaked water completes an electrical circuit to turn on an alarm. However, such alarms do not turn off water.

Repairing the damages inflicted on a home caused by water-related issues can be expensive and agonizing for both homeowners and insurance companies. Many insurance companies recognize the commonality of water damage as natural elements are among the most common threats in terms of disturbing a home environment.

In a parallel trend, with the rising number of elders living alone, society needs an inexpensive, yet secure way to monitor their safety.

SUMMARY

In one aspect, a system to characterize water in a building includes a processor; a water sensor coupled to the processor; a water valve coupled to the processor; an encryption module executed by the processor to secure water data; and a transceiver to communicate secured water data over a network to a remote processor.

Implementations of the above aspect may include one or more of the following. A blockchain can be accessed by the processor through the transceiver. Sensor data is stored in the blockchain to avoid tampering. Data transactions sent by the processor are signed with elliptic curve signature. An application program interface (API) to allow a mobile device to query the processor for water data. The processor receives commands from a phone app to the devices and communicate readings from the devices to the phone app using the API. The processor uses the API to communicate an email or a text notification based on a predetermined event such as water leakage detection. The communications between network devices and the blockchain enhanced security features that protect the connections and the privacy of the users. The system can automatically turn off the water valve in case of a leak. The system can open water flow on a selected pipe on a scheduled time. The system can disaggregate water usage at an appliance or fixture level. A learning machine can disaggregate water usage. The encryption does not allow using the same random key for a digital signature twice and wherein encryption parameters for a digital signature (r,s) are different for the digital signature because a sender and a receiver track and reject re-using the same (r).

In another aspect, a method to manage water in a building includes reading from one or more sensors water flow into the building; storing sensor data on a blockchain; determining if the water flow is from a leakage above a predetermined threshold and shutting off water into the building.

The method includes notifying a user of the water leakage prior to shutting off water into the building. The system can communicate with a mobile device through an encrypted application program interface (API). The method includes securing communications with an elliptic curve signature. When not used, the processor can be used to mine for a cryptocurrency using a low power microcontroller. The system allows accessing secured sensor data on the blockchain and rendering the result on a mobile device.

According to another aspect, a water detection system includes a water usage detector with one or more water pressure sensors coupled to the water flow and an electrically actuated shut-off valve. The system stores data on the blockchain for security.

In another aspect, the system is a smart water-shutoff valve with built-in sensors that monitor water usage and detect leaks. In certain embodiments, the system can measure water flow, pressure, and temperature, and combine that data with machine learning to detect even small drip leaks. If the system detects a leak, depending on the amount of water leakage, it will automatically shut off the water to minimize home damage. For drip leaks, the system can leave the water flowing, but generate an alarm for the user.

Toilets are the main source of water use in a home—accounting for about one-fourth of an average home's water consumption. To address toilets, in another aspect, water consumption associated with the fixtures or appliances is monitored over time, and if the average water flow for the same fixtures/appliances exceeds a threshold indicative of a leak, the system can generate an alarm to the user.

In some aspects, based on the water flow, the system can identify a plurality of types of leaks. It achieves this applying deep learning to sensor data to identify leaks, such as leaks from a hose running in the backyard, drip leaks, pinhole leaks, frozen-pipe leaks, and burst-pipe leaks.

In another aspect, water usage sensors are used for monitoring elderly living by themselves. This is done by looking at water consumption and calling for a safety follow up by examining water usage to trigger a follow up call.

Advantages of the system may include one or more of the following. The system provides detailed water usage analysis and can perform leak detection and water shut-off to prevent flooding or water damage. The system can disaggregate water usage in depth, for example, shower usage, appliance usage, and garden watering usage. The system saves money for the homeowner on the water bill, and may save insurance costs as well since the ideal household for an insurance company is one that has a lower risk of an expensive incident occurring. The system reduces insurance premium as it reduces claims made for water damages so that insurance companies won't need to spend as much money each year to pay off claims. As such, the system can alleviate the pain caused by water damages for both homeowners and insurance companies. Homeowners can save money on their premiums and not have to waste their time and energy repairing any damages to their home. Insurance companies have the ability to save money because they will not need to spend as much money on insurance claims. Further, the system can infer activities of daily-life from the water usage pattern, and alert 911 or caregivers if no water usage activity is detected.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

FIGS. 4A-4B show an exemplary daily-activity monitoring process to monitor people safety.

DESCRIPTION OF EXAMPLES OF EMBODIMENTS

Figure 1:
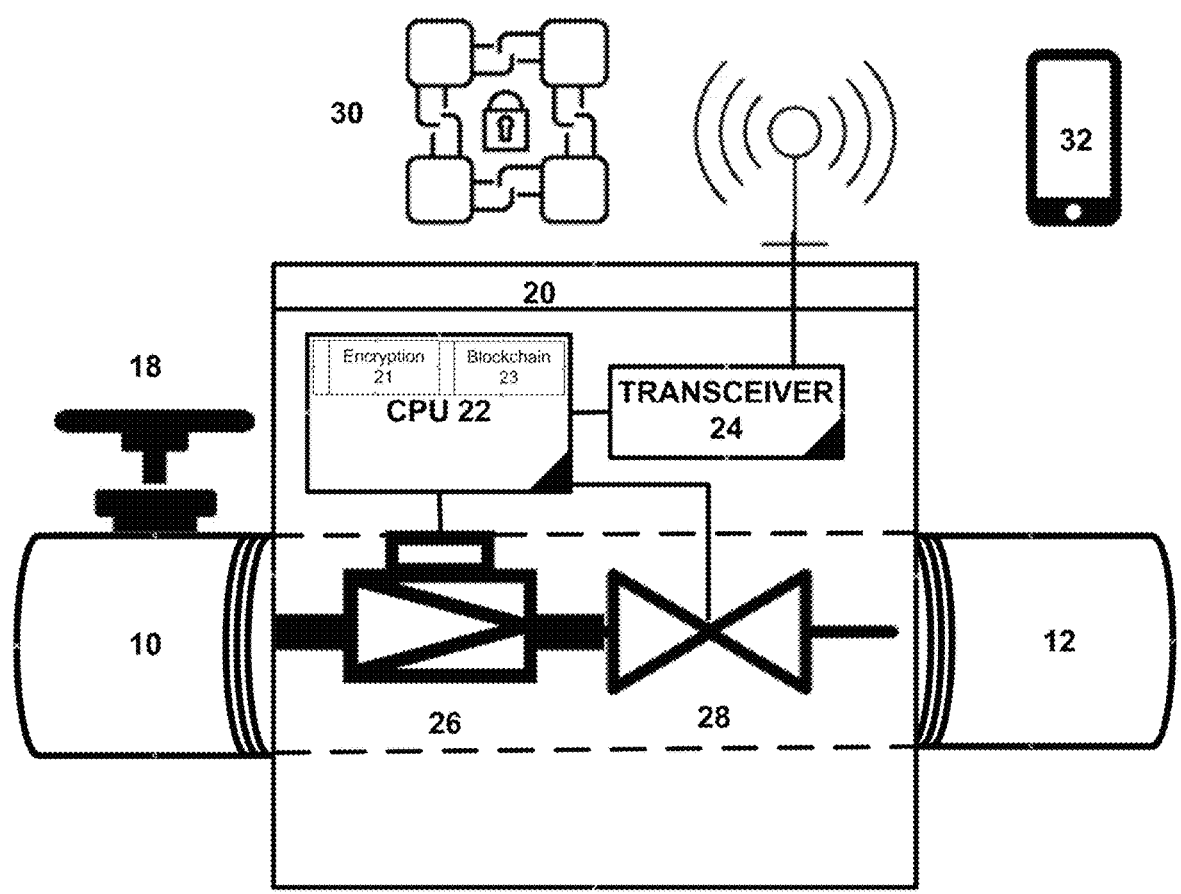
FIG. 1 shows an exemplary water monitoring system

FIG. 1 shows an exemplary water monitoring and control system 20. The system is installed between two pipes 10 and 12, with pipe 12 coupled to the main water pipe from the water utility. In a typical house or building, water can be supplied to water system from a water-supply utility system that delivers water through pipes at high pressure using a system of high-pressure pumps. A pressure regulator can be installed at the interface between the utility system and the water system. Pressure regulator can convert the utility supplied pressure of the water (e.g., approximately 100-150 pounds per square inch (psi)) down to pressure levels that are suitable for water system in a home (e.g., approximately 20-80 psi), such as to ensure safety and longevity of fixtures, pipes, and/or appliances in water system. As used herein, psi refers to pounds per square inch gauge (psig), which is measured relative to atmospheric pressure.

At the entrance, the system 20 has a manual valve 18 to allow user override. Water from pipe 10 is detected by a flow meter 26 and then traverses a full port valve 28, both of which are connected to a processor 22. The processor 22 communicates to the Internet or home intranet with a transceiver 24. Data processed by the processor 22 can be stored on a blockchain 30, and user input can be done through a mobile app on a mobile device 32, such as a smart phone or a tablet, for example.

An exemplary sensor can be employed in many different embodiments or examples not specifically depicted or described herein. In a number of embodiments, sensing device can include a controller and one or more sensors that can be used to gather data used for collecting data used in leak characterization. For example, as shown in FIG. 1, the sensors can include a pressure sensor and/or a flow meter. In a number of embodiments, sensing device can include an automatic shutoff valve, which can be controlled by controller, such as by sending a wireless control signal.

The flow meter 26 can be a water flow sensor configured to measure the consumption of water in a water system. The valve 28 can be a water actuator valve which is used to control the water flow in the water pipes by stopping the water flow or allowing the water flow. The processor can be part of a smart controller board based on IOT microcontrollers which is connected to the water flow sensor and the actuator valve at the same time. The microcontroller board calculates the water flow readings from the water flow sensor and increments the amount of water used based on the signals received from the water flow sensor, and the microcontroller board sends direct commands to the actuator valve to stop the water flow or allow the water flow in the pipes.

In other embodiments, ultrasonic sensors can be used to detect sounds in the water flow and deep learning is applied to the sounds to learn leakage pattern. In other embodiments, a turbine mechanism provides accurate flow measurements of cold water. The processor can store in memory a resettable batch total, flow rate and it also a lifetime total. The processor can perform local calibration and adjustments to fine tune the measurements.

After passing through water sensor(s) and the water valve, the water continues into the rest of the house, for example through a water heater and then through various fixtures. The fixtures can include a kitchen faucet, a dishwasher, and a refrigerator in a kitchen; faucets and toilets in a first, a second, and a third bathroom, a shower in the second bathroom, a shower tub in the third bathroom, outdoor water taps, and a washing machine. The term "fixtures" can refer to appliances, faucets, or other pieces of equipment that is attached to water system, which can make use of the water delivered by water system. The fixtures can include a kitchen faucet, a dishwasher, and a refrigerator in a kitchen; faucets and toilets in a first, a second, and a third bathroom, a shower in the second bathroom, a shower tub in the third bathroom, outdoor water taps, and a washing machine. The term "fixtures" can refer to appliances, faucets, or other pieces of equipment that is attached to water system, which can make use of the water delivered by water system.

The system 20 is installed using usual installation techniques to ensure leak-free deployment. In one embodiment, the system includes a sensing device with a water flow sensor in the unit, along with a remotely controlled valve that can turn off water in case of a large pipe leakage, for example.

In some embodiments, in which flow meter is included in sensing device, flow meter can include an in-line flow turbine sensor. A flow turbine sensor can include a rotor that is turned by a liquid force proportional to flow of the liquid in a flow direction. For example, liquid flow of the water causes a bladed turbine inside the flow meter to turn at an angular velocity directly proportional to the velocity of the liquid being monitored. As the blades pass beneath a magnetic pickup coil in the flow meter, a pulse signal is generated. For example, a Hall Effect sensor can be included that supplies pulses used for digital or analog signal processing. Each pulse can represent a discrete volume of liquid. A frequency of the pulse signal can be directly proportional to angular velocity of the turbine and the flow rate. A large number of pulses can provide high resolution. In other examples, flow meter can include an ultrasonic flow meter that determines time of flight measurement, an acoustic (Doppler) flow meter, or any other flow meter that can monitor flow of a substance and acquire flow data representing the flow. In a number of embodiments, the flow data measured by flow meter can be sent to controller using a flow data line.

The system 20 can transmit water related data and sensor output to a remote processor via the wireless transceiver 24 which can be a WiFi, Bluetooth, Zigbee, or suitable transceiver. The system 20 can receive remote commands to turn on/off water supply to the house in case of a large leak in the house. To protect against hacking, communications are stored on the blockchain. Major features include:

1. Data storage in a blockchain—The data stored by the water flow monitor device is saved into a blockchain network, not just a regular database, which guarantees protection over data history from modifications.

2. Elliptic curves digital signature—The data transactions sent from the water flow monitoring devices 20 are signed by the devices using the elliptic curves digital signature algorithm, which guarantees the legitimacy of the source devices sending the data to the blockchain network.

3. API level—The devices also log the live readings to the API to send commands from the phone app to the devices and receive readings from the devices to the phone app 4. WiFi connections—The microcontrollers within the water solution monitor devices can connect to the internet via WiFi which makes it easier to connect without the need for network cables 5. High security over enhanced connections—The communications between the devices and the blockchain network or the API gateways, are based on enhanced security features that protect the connections and the privacy of the users.

6. Notifications—The API level sends email or SMS notifications to the owners based on certain events, for example water leakage detection.

7. Automated shutdown or open water flow—Based on different features available to the owners through the app, users can choose to activate an automated shutdown for water or open water flow within the pipes based on scheduled times or water leakage detections. In one embodiment, the water leakage is determined from the average setting on the server are compared to the water flow readings that are received from the device. The data comparison is carried by the API server and is managed by the code controlling the communications between the client side and the device side. The continuity of the cron job is done by the connections from the microcontrollers in the devices presented in FIG. 1 because the devices connect to the server every 5 seconds, therefore the initiations of the cron jobs are based on the microcontrollers calling the API scripts through the connections to the server, and during those connections the communications are carried to deliver readings or receive on and off commands.

Figure 2:
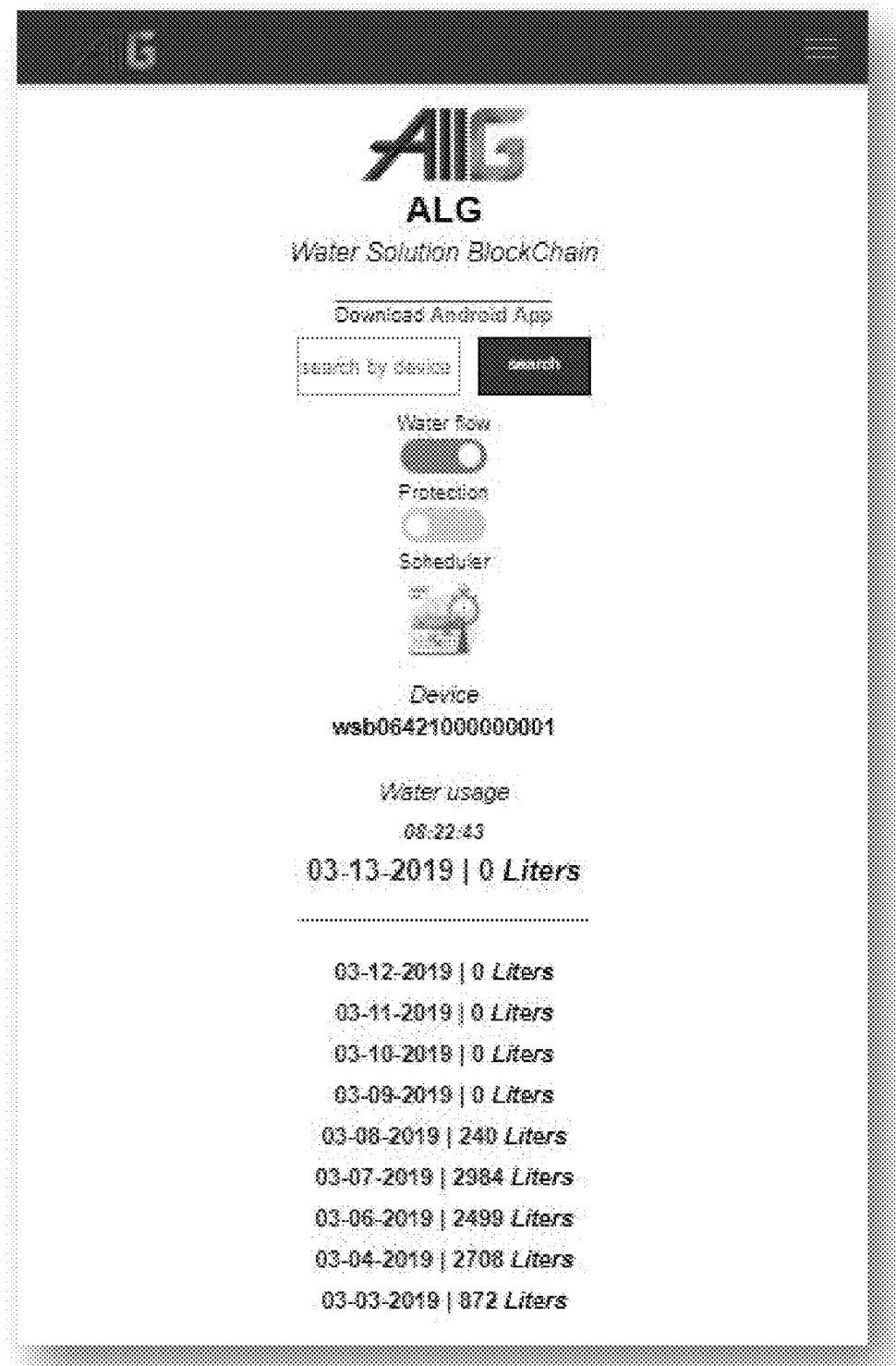
FIG. 2 shows a mobile app to monitor and control water flow in case of leakage.

In one embodiment, the device or unit 20 communicates with a mobile app shown in FIG. 2 and informs the user of unusual water flow, and accepts water shutoff commands from the user. The smartphone provides central command. With the app, the user can get alerts and turn water on or off from anywhere in the world. The user can view the home's water consumption, or even contact a plumber to have them come fix a problem. Further, if the user is not monitoring water consumption, the system is smart enough to automatically shut the water off for the user if something catastrophic occurs. The app has a graphical interface such as those in FIG. 2, but the graphical interface can include a web interface as well as a mobile device interface. The graphical interface provides notification and interaction functions for a user of the user device. For example, the graphical interface can communicate or present leak information for the user, and can allow the user to provide input to enable and disable various fixtures in the pressurized system, or to enable or disable various settings (e.g., types of notifications such as reporting alerts, frequency of notifications, types of leaks to report, or any other suitable setting).

The communication between the app on the mobile device and the recipient unit 20 is protected by a high level of cryptography which involves symmetric and asymmetric encryptions, it also involves enhanced algorithms that prevent intruders and hackers from being able to duplicate a radio signal that was sent from the legitimate water sensor and try to send it as it was (duplicate) in an attempt to mess with the recipient unit.

The term cryptographic means applying a digital signature based on Elliptic Curve Digital Signature Algorithm (ECDSA), for example or an RSA. ECDSA is a variant of the Digital Signature Algorithm (DSA). Taking an example of the ECDSA based on elliptic curves digital signature and Diffie Hellman key exchange, the commands sent from the water sensor to the recipient unit will carry a digital signature, in addition to this, an additional enhancement is applied to prevent a hacker from copying a command including a correct digital signature and trying to repeat it and tamper with the recipient unit, this new level is based on an algorithm which does not allow using the same random key for a digital signature twice, therefore the parameters for the digital signature (r,s) will always be different for the digital signature because the sender (mobile app) and the receiver (water sensor unit) will keep track of which (r) has been used before and will not permit re-using the same (r).

If the water sensor will send a command every second, it means it will send 31,536,000 commands per year, and it uses the secp192r1 curve which is one of the smallest elliptic curves it means there is 1990455902900393443631338604517905383086743862399800 years left to run a command with a new signature every second.

Figure 3:
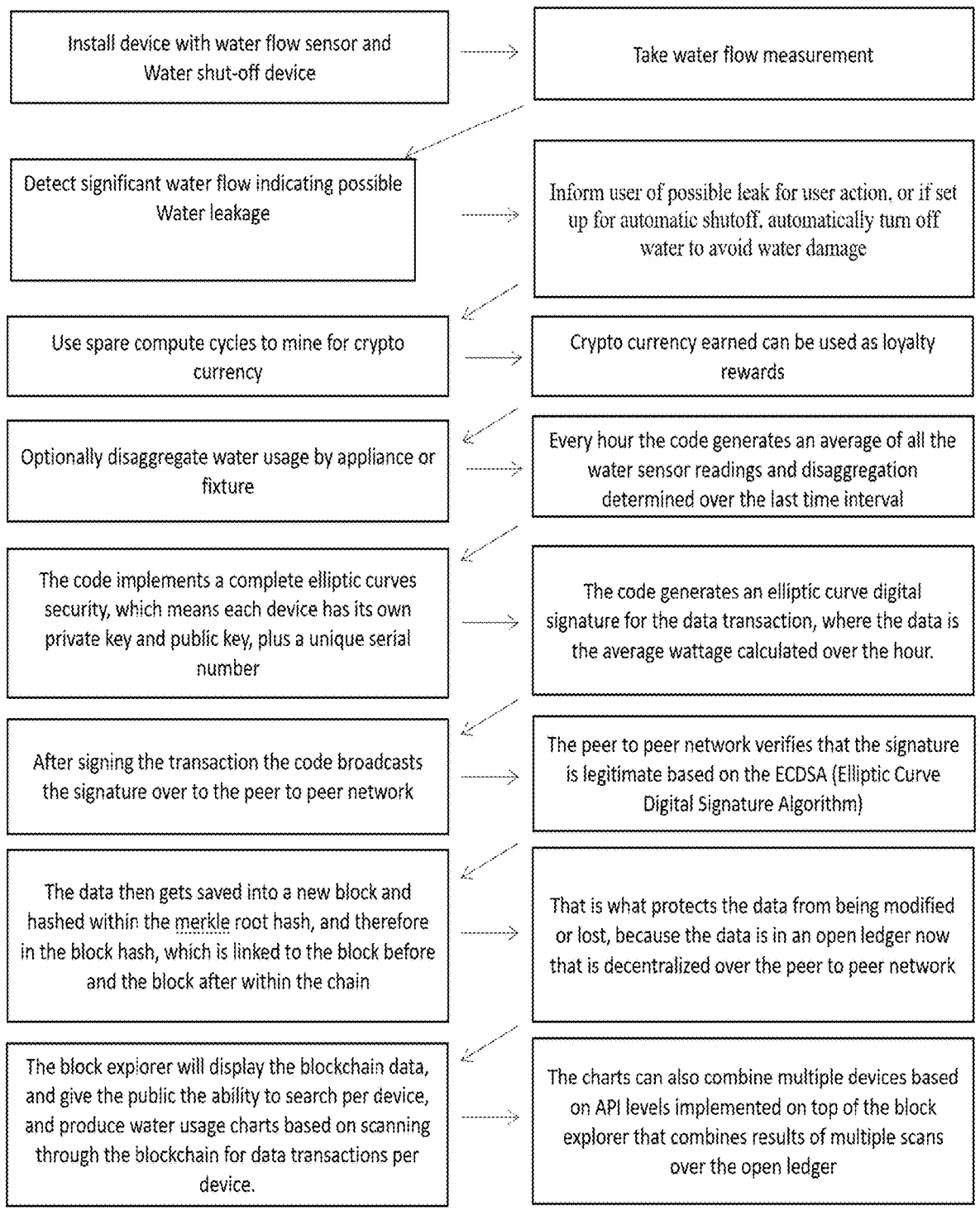
FIG. 3 shows an exemplary process for FIGS. 1-2.

FIG. 3 shows an exemplary flowchart for capturing water usage data, detecting excessive or unusual uninterrupted water consumption, and either warning the user or automatically turning off the water main entering the house to avoid water damage. When the CPU is not used, the system applies processor power to mine for cryptocurrency where users are rewarded.

The system can also perform water usage disaggregation to advise users of detailed water usage and cost. In one embodiment, disaggregation of water consumption events is done based on the detailed water consumption data. The system can determine short events (quick washing, water refill), intermediate recurring events (toilet flushing—type 1 and type 2), regular long events from appliances (washers), and irregular long events (showers). Users are provided detailed information on their water consumption (e.g., by showing the cost that occurred due to showers, or the usage of washing machines). These patterns are differentiated by the flow rate and water sound, and the data is provided to a deep learning machine for recognition.

FIG. 4A-4B show an exemplary learning system that is used to disaggregate water consumption in a building. The system initially captures water pressure data from actuations of toilets, faucets, showers, and clothing washers. From the water pressure signatures, the system can infer daily activity. For example, the shape and size of the water pressure/sound waveform may be used to help identify the load. The system can analyze features such as harmonics, sub-harmonics, starting-transient peak; starting-transient duration, starting-transient time-constant, or starting-transient shape. Signal processing techniques can be used to analyze the total household water use data, into particular daily activities based on the unique properties of each load. A library of properties of common loads can be maintained and accessed by the user interface, user computer, or remote system. For example, the library can include properties of appliances from model years that are most likely to be used in the monitored environment. When located on the user interface or user computer, this library can be updated periodically, such as through the internet by the remote server. Other programming of the user interface, or software running on the user computer, can also be updated via the internet, such as with improved algorithms, heuristics, and the like. In certain implementations, training or other user provided data is used to update a library that can be shared with other users. With a broad set of load profiles, the systems will be able to, in particular examples, automatically identify the loads consuming the majority of the utilities in the monitored area. The system can show the data along with proposed labels for the user to review and revise/accept. Then the system trains the deep learning system to classify different water usage events. The deep learning can be neural networks such as Tensorflow, among others. In other implementations, the systems use a processing algorithm that employs statistical analysis, such as a least squares fit, to identify individual loads.

From the water pressure signatures, the system can infer daily activity. FIG. 4A shows an exemplary process to non-invasively infer daily life activities using a combination of motion sensor and water flow sensing. The motion sensor communicates motion data to a gateway which forwards the data for activity of life analysis to a processor, and based on patterns that indicate the user may need help, the system can have a call center operator to call and inquire before requesting 911 assistance, or family assistance, depending on user preference.

Although the detection needs not be done in any particular order, an exemplary sequence is discussed. In one implementation, the process detects wake-up time in the daily activity patterns in 201. For example, the wake-up time may be detected by detecting existence of a person on a bed by detecting faucet/toilet water activities in the restroom in the morning. A toilet time detection 203 detects toilet-using time in the daily activity patterns by detecting that the appropriate toilet water consumption rate. A bathing time detection 205 detects bathing time in the daily activity patterns by detecting a high volume of water consumption rate and that the electric lamp in the bathroom is turned on. A cooking time detection 206 detects cooking time in the daily activity patterns and is comprised of detecting water flow in the kitchen area.

A room-to-room movement frequency detection 207 detects the number of movements between rooms in the daily activity patterns and is comprised of one or more sensors or one or more home electric appliances for detecting the number of movements between the rooms. For example, the number of movement between the rooms may be detected by detecting that the electric lamps in each room are turned on/off or detecting that other home electric appliances in each room are turned on/off.

Data of the daily activity patterns is detected by physical/virtual detection sensors using waterflow and transmitted to the data processing apparatus in a wireless or wired manner and, then, the transmitted data is stored in databases of the data processing apparatus. Every time the data processing apparatus receives the data of the daily activity patterns from the detection sensors, it performs the statistical analyses of the stored data so as to determine whether the received daily activity pattern is abnormal or not. If it is determined that the received daily activity pattern is abnormal, the reporting apparatus in the home of the person to be observed or the reporting apparatuses are informed of the abnormality. In response to the abnormality notification, the person to be observed or the observers checks whether the abnormality notification is correct or not and gives the data processing apparatus feedback about whether the abnormality notification is correct or not. Based on the feedback information, the data processing apparatus determines whether the daily activity patterns that have been considered abnormal correspond to the actual abnormalities or not and learns the daily activity patterns unique to the person to be observed. Here, although examples of the sensors for detecting the daily activity patterns include only the wake-up time detection, the bedtime detection, the toilet time detection, the room cleaning time detection, the bathing time detection, the cooking time detection and the room-to-room movement frequency detection as described above, other sensors for detecting the daily activity patterns may be provided.

For example, if the user typically sleeps between 10 pm to 6 am, the location would reflect that the user's location maps to the bedroom between 10 pm and 6 am. In one exemplary system with the instant water disaggregation (virtual sensor) an optional heart rate monitor or a motion sensor in the room (physical sensor), the system builds a schedule of the user's activity as follows:

| Location | Time Start | Time End | Heart Rate |
| --- | --- | --- | --- |
| Bed room | 10 pm | 6 am | 60-80 |
| Gym room | 6 am | 7 am | 90-120 |
| Bath room | 7 am | 7:30 am | 85-120 |
| Dining room | 7:30 am | 8:45 am | 80-90 |
| Home Office | 8:45 am | 11:30 am | 85-100 |
| ... | | | |

FIG. 4B shows an exemplary process to monitor a patient. First, the process acquires water flow data (304). Next, the process identifies individual fixture or appliance water consumption from the water flow data (306). The process then determines daily life activity patterns from the individual appliance utility consumption; and sending a request for assistance when the pattern matches one or more predetermined conditions (310).

The predetermined conditions can be dangerous conditions such as when water is on or off for unusual period. In embodiments with physical sensors to supplement the virtual sensor (water use disaggregation system), the dangerous condition can include being in one position (such as bed or chair) for too long; having an oven on for an extended period, having the TV on without turning on lights in the bed room past a normal sleep time, or may be as simple as the cellphone being turned off for too long. The predetermined conditions can be programmed by a system installer, and may not relate to dangerous conditions, but simply conditions where someone such as a family member or a caretaker should follow up to ensure patient safety.

In one embodiment, the phone can simply request that the user shuts off an alarm countdown or acknowledge that the patient is doing ok to prevent false alarms. The daily life activity tracking is adaptive in that it gradually adjusts to the user's new activities and/or habits. If there are sudden changes, the system flags these sudden changes for follow up. For instance, if the user spends three hours in the bathroom, the system prompts the third party (such as a call center) to follow up with the patient to make sure he or she does not need help.

In one embodiment, data driven analyzers may be used to track the patient's habits. These data driven analyzers may incorporate a number of models such as parametric statistical models, non-parametric statistical models, clustering models, nearest neighbor models, regression methods, and engineered (artificial) neural networks. Prior to operation, data driven analyzers or models of the patient's habits or ambulation patterns are built using one or more training sessions. The data used to build the analyzer or model in these sessions are typically referred to as training data. As data driven analyzers are developed by examining only training examples, the selection of the training data can significantly affect the accuracy and the learning speed of the data driven analyzer. One approach used heretofore generates a separate data set referred to as a test set for training purposes. The test set is used to avoid overfitting the model or analyzer to the training data. Overfitting refers to the situation where the analyzer has memorized the training data so well that it fails to fit or categorize unseen data. Typically, during the construction of the analyzer or model, the analyzer's performance is tested against the test set. The selection of the analyzer or model parameters is performed iteratively until the performance of the analyzer in classifying the test set reaches an optimal point. At this point, the training process is completed. An alternative to using an independent training and test set is to use a methodology called cross-validation. Cross-validation can be used to determine parameter values for a parametric analyzer or model for a non-parametric analyzer. In cross-validation, a single training data set is selected. Next, a number of different analyzers or models are built by presenting different parts of the training data as test sets to the analyzers in an iterative process. The parameter or model structure is then determined on the basis of the combined performance of all models or analyzers. Under the cross-validation approach, the analyzer or model is typically retrained with data using the determined optimal model structure.

In general, multiple dimensions of a user's daily activities such as start and stop times of interactions of different interactions are encoded as distinct dimensions in a database. A predictive model, including time series models such as those employing autoregression analysis and other standard time series methods, dynamic Bayesian networks and Continuous Time Bayesian Networks, or temporal Bayesian-network representation and reasoning methodology, is built, and then the model, in conjunction with a specific query makes target inferences.

Bayesian networks provide not only a graphical, easily interpretable alternative language for expressing background knowledge, but they also provide an inference mechanism; that is, the probability of arbitrary events can be calculated from the model. Intuitively, given a Bayesian network, the task of mining interesting unexpected patterns can be rephrased as discovering item sets in the data which are much more—or much less—frequent than the background knowledge suggests. These cases are provided to a learning and inference subsystem, which constructs a Bayesian network that is tailored for a target prediction. The Bayesian network is used to build a cumulative distribution over events of interest.

In another embodiment, a genetic algorithm (GA) search technique can be used to find approximate solutions to identifying the user's habits. Genetic algorithms are a particular class of evolutionary algorithms that use techniques inspired by evolutionary biology such as inheritance, mutation, natural selection, and recombination (or crossover). Genetic algorithms are typically implemented as a computer simulation in which a population of abstract representations (called chromosomes) of candidate solutions (called individuals) to an optimization problem evolves toward better solutions. Traditionally, solutions are represented in binary as strings of Os and Is, but different encodings are also possible. The evolution starts from a population of completely random individuals and happens in generations. In each generation, the fitness of the whole population is evaluated, multiple individuals are stochastically selected from the current population (based on their fitness), modified (mutated or recombined) to form a new population, which becomes current in the next iteration of the algorithm.

Substantially any type of learning system or process may be employed to determine the user's ambulatory and living patterns so that unusual events can be flagged.

In one embodiment, clustering operations are performed to detect patterns in the data. In another embodiment, a neural network is used to recognize each pattern as the neural network is quite robust at recognizing user habits or patterns. Once the treatment features have been characterized, the neural network then compares the input user information with stored templates of treatment vocabulary known by the neural network recognizer, among others. The recognition models can include a Hidden Markov Model (HMM), a dynamic programming model, a neural network, a fuzzy logic, or a template matcher, among others. These models may be used singly or in combination.

Dynamic programming considers all possible points within the permitted domain for each value of i. Because the best path from the current point to the next point is independent of what happens beyond that point. Thus, the total cost of [i(k), j(k)] is the cost of the point itself plus the cost of the minimum path to it. Preferably, the values of the predecessors can be kept in an M×N array, and the accumulated cost kept in a 2×N array to contain the accumulated costs of the immediately preceding column and the current column. However, this method requires significant computing resources. For the recognizer to find the optimal time alignment between a sequence of frames and a sequence of node models, it must compare most frames against a plurality of node models. One method of reducing the amount of computation required for dynamic programming is to use pruning. Pruning terminates the dynamic programming of a given portion of user habit information against a given treatment model if the partial probability score for that comparison drops below a given threshold. This greatly reduces computation.

Considered to be a generalization of dynamic programming, a hidden Markov model is used in the preferred embodiment to evaluate the probability of occurrence of a sequence of observations $O(1), O(2), \ldots O(t), \ldots, O(T)$, where each observation $O(t)$ may be either a discrete symbol under the VQ approach or a continuous vector. The sequence of observations may be modeled as a probabilistic function of an underlying Markov chain having state transitions that are not directly observable. In one embodiment, the Markov network is used to model a number of user habits and activities. The transitions between states are represented by a transition matrix $A=[a(i,j)]$. Each $a(i,j)$ term of the transition matrix is the probability of making a transition to state $j$ given that the model is in state $i$. The output symbol probability of the model is represented by a set of functions $B=[b(j)(O(t)]$, where the $b(j)(O(t)$ term of the output symbol matrix is the probability of outputting observation $O(t)$, given that the model is in state $j$. The first state is always constrained to be the initial state for the first time frame of the utterance, as only a prescribed set of left to right state transitions are possible. A predetermined final state is defined from which transitions to other states cannot occur. Transitions are restricted to reentry of a state or entry to one of the next two states. Such transitions are defined in the model as transition probabilities. Although the preferred embodiment restricts the flow graphs to the present state or to the next two states, one skilled in the art can build an HMM model without any transition restrictions, although the sum of all the probabilities of transitioning from any state must still add up to one. In each state of the model, the current feature frame may be identified with one of a set of predefined output symbols or may be labeled probabilistically. In this case, the output symbol probability $b(j) O(t)$ corresponds to the probability assigned by the model that the feature frame symbol is $O(t)$. The model arrangement is a matrix $A=[a(i,j)]$ of transition probabilities and a technique of computing $B=b(j) O(t)$, the feature frame symbol probability in state $j$. The Markov model is formed for a reference pattern from a plurality of sequences of training patterns and the output symbol probabilities are multivariate Gaussian function probability densities. The patient habit information is processed by a feature extractor. During learning, the resulting feature vector series is processed by a parameter estimator, whose output is provided to the hidden Markov model. The hidden Markov model is used to derive a set of reference pattern templates, each template representative of an identified pattern in a vocabulary set of reference treatment patterns. The Markov model reference templates are next utilized to classify a sequence of observations into one of the reference patterns based on the probability of generating the observations from each Markov model reference pattern template. During recognition, the unknown pattern can then be identified as the reference pattern with the highest probability in the likelihood calculator. The HMM template has a number of states, each having a discrete value. However, because treatment pattern features may have a dynamic pattern in contrast to a single value. The addition of a neural network at the front end of the HMM in an embodiment provides the capability of representing states with dynamic values. The input layer of the neural network comprises input neurons. The outputs of the input layer are distributed to all neurons in the middle layer. Similarly, the outputs of the middle layer are distributed to all output states, which normally would be the output layer of the neuron. However, each output has transition probabilities to itself or to the next outputs, thus forming a modified HMM. Each state of the thus formed HMM is capable of responding to a particular dynamic signal, resulting in a more robust HMM. Alternatively, the neural network can be used alone without resorting to the transition probabilities of the HMM architecture.

The system allows patients to conduct a low-cost, comprehensive, real-time monitoring of their vital daily life activities. Information can be viewed using an Internet-based website, a personal computer, or simply by viewing a display on the monitor. Data measured several times each day provide a relatively comprehensive data set compared to that measured during medical appointments separated by several weeks or even months. This allows both the patient and medical professional to observe trends in the data, such as a gradual increase or decrease in blood pressure, which may indicate a medical condition. The invention also minimizes effects of white coat syndrome since the monitor automatically makes measurements with basically no discomfort; measurements are made at the patient's home or work, rather than in a medical office. To view information on daily life activities, the patient or an authorized third party such as family members, emergency personnel, or medical professional accesses a patient user interface hosted on the web server through the Internet from a remote computer system. The patient interface displays vital information such as ambulation, blood pressure and related data measured from a single patient. The system may also include a call center, typically staffed with medical professionals such as doctors, nurses, or nurse practioners, whom access a care-provider interface hosted on the same website on the server. The care-provider interface displays vital data from multiple patients.

In one embodiment, the web page hosted by the server includes a header field that lists general information about the patient (e.g. name, age, and ID number, general location, and information concerning recent measurements); a table that lists recently measured blood pressure data and suggested (i.e. doctor-recommended) values of these data; and graphs that plot the systolic and diastolic blood pressure data in a time-dependent manner. The header field additionally includes a series of tabs that each link to separate web pages that include, e.g., tables and graphs corresponding to a different data measured by the wearable device such as calorie consumption/dissipation, ambulation pattern, sleeping pattern, heart rate, pulse oximetry, and temperature. The table lists a series of data fields that show running average values of the patient's daily, monthly, and yearly vital parameters. The levels are compared to a series of corresponding 'suggested' values of vital parameters that are extracted from a database associated with the web site. The suggested values depend on, among other things, the patient's age, sex, and weight. The table then calculates the difference between the running average and suggested values to give the patient an idea of how their data compares to that of a healthy patient. The web software interface may also include security measures such as authentication, authorization, encryption, credential presentation, and digital signature resolution. The interface may also be modified to conform to industry-mandated, XML schema definitions, while being 'backwards compatible' with any existing XML schema definitions.

The system provides for self-registration of Internet enabled appliances by the user. Data can be synchronized between the Repository and appliance(s) via the base station 20. The user can preview the readings received from the appliance(s) and reject erroneous readings. The user or treating professional can set up the system to generate alerts against received data, based on pre-defined parameters. The system can determine trends in received data, based on user defined parameters.

In one embodiment, users may set up alerts or reminders that are triggered when one or more reading meet a certain set of conditions, depending on parameters defined by the user. The user chooses the condition that they would like to be alerted to and by providing the parameters (e.g. threshold value for the reading) for alert generation. Each alert may have an interval which may be either the number of data points or a time duration in units such as hours, days, weeks or months. The user chooses the destination where the alert may be sent. This destination may include the user's portal, e-mail, pager, voice-mail or any combination of the above.

Trends are determined by applying mathematical and statistical rules (e.g. moving average and deviation) over a set of reading values. Each rule is configurable by parameters that are either automatically calculated or are set by the user.

The user may give permission to others as needed to read or edit their personal data or receive alerts. The user or clinician could have a list of people that they want to monitor and have it show on their "My Account" page, which serves as a local central monitoring station in one embodiment. Each person may be assigned different access rights which may be more or less than the access rights that the patient has. For example, a doctor or clinician could be allowed to edit data for example to annotate it, while the patient would have read-only privileges for certain pages. An authorized person could set the reminders and alerts parameters with limited access to others. A call center can call to check up on the patient if needed.

In one embodiment, a system for non-invasive monitoring of a patient who uses appliances on a daily basis, includes: one or more utility meters or water sensors; a non-invasive daily activity monitor coupled to one or more of the meter/sensor to identify turn on or turn off for each individual fixture or appliance; and a pattern recognizer coupled to the non-invasive daily life activity monitor to infer daily life activity and to detect variance in the daily life activity and wherein the pattern recognizer sends a request to assist the patient when the variance exceeds a predetermined threshold.

The pattern recognizer classifies patient daily life activities including wake-up habit, medicine compliance habit, ambulatory habit, sleep habit, bathroom habit, entertainment habit, telephone call habit, eating and drinking habit, work habit, or excise habit. A physical or medical sensor can be worn by the patient, such as a heart rate sensor or an EKG sensor. A wireless communicator can connect the patient with a remote person including a family member, a doctor, a nurse, a medical assistant, or a caregiver. The pattern recognizer analyzes daily life activity pattern by analyzing telephone usage pattern, electric usage pattern, gas usage pattern, and water usage pattern together with a hidden markov model (HMM) or a neural network. The system can correlate daily life activity pattern by analyzing electric usage pattern, gas usage pattern, and water usage pattern together. One or more cameras positioned to capture a video of the patient; and a server coupled to the one or more cameras, the server executing code to detect a dangerous condition for the patient based on the video and allow a remote third party to view images of the patient when a predetermined condition is detected.

In another aspect, a monitoring system for a person includes a non-invasive daily activity monitor coupled to a water sensor to identify usage of each individual appliance used by the person; a pattern recognizer coupled to the non-invasive daily life activity monitor to infer daily life activity and to detect variance in the daily life activity; and a cellular telephone having an accelerometer to detect motion from the person, wherein the pattern recognizer or the cellular telephone sends a request to assist the person if needed. One implementation has the following:

1. Keep data of water usage in a blockchain/API servers. Each block contains a cryptographic hash of the previous block,[6] a timestamp, and transaction data (generally represented as a merkle tree root hash). By design, a blockchain is resistant to modification of the data. It is "an open, distributed ledger that can record transactions between two parties efficiently and in a verifiable and permanent way". For use as a distributed ledger, a blockchain is typically managed by a peer-to-peer network collectively adhering to a protocol for inter-node communication and validating new blocks. Once recorded, the data in any given block cannot be altered retroactively without alteration of all subsequent blocks, which requires consensus of the network majority. Although blockchain records are not unalterable, blockchains may be considered secure by design and exemplify a distributed computing system with high Byzantine fault tolerance. Decentralized consensus has therefore been claimed with a blockchain.

2. Report a leak to an email or text message to a phone. This feature can detect the smallest amount of leakage, once one liter has moved through the flow meter, the valve would shut off the line. And at that time the API server will send a notification to the owner's phone in a way of a text message or an email.

3. Stop the water flow until the leak is repaired. The customer will be able to take the device off of protection mode and with his phone walk around his home or business and manually turn the flow on and off through the API to find the leak.

4. Use for the elderly people to assure water usage otherwise send a notification placed on a call center to notify next of keen that their elderly parents have not used water for the last 12 hours for example.

Besides the data storage on the blockchain, there is instant data transactions over the API connections which can be adjusted to each specific need, for example a person might want a notification if at his parent's house there hasn't been water used for 5 hours, another person might want a notification after 12 hours of no water flow.

For the medical insurance industry this could assure notification before an elderly person gets dehydrated and needs a more intensive medical care, for example, the water monitor devices can be spread around the house on partial water lines, to notify the care taker whether there was water flow in the shower line, or the kitchen sink tap water line, or the water purifier system for their drinking. And this way the care taker will be able to determine different situations by monitoring the different water usages on their phone.

Figure 5:
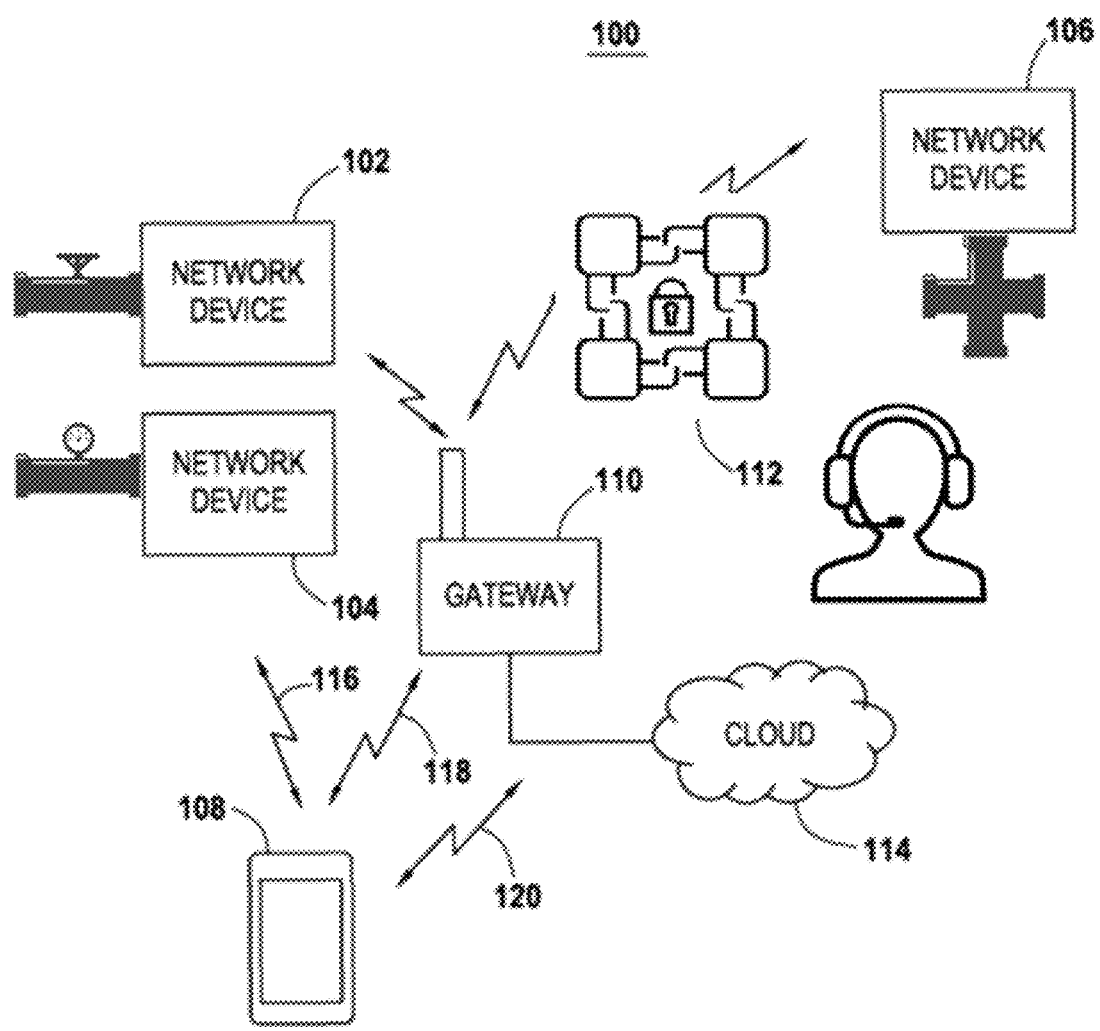
FIG. 5 shows a network to control a plurality of water users.

FIG. 5 illustrates an example of a local area network 100. Local area network 100 is merely exemplary and is not limited to the embodiments presented herein. The local area network can be employed in many different embodiments or examples not specifically depicted or described herein. In some embodiments, the local area network 100 can include IOT water sensor board 102, IOT water sensor board 104, and IOT water sensor board 106. In some embodiments, any of IOT water sensor boards 102, 104, 106 may include an Internet of Things (IoT) device. As used herein, an IoT device is a device that includes sensing and/or control functionality as well as a WiFi™ transceiver radio or interface, a Bluetooth™ transceiver radio or interface, a Zigbee™ transceiver radio or interface, an Ultra-Wideband (UWB) transceiver radio or interface, a WiFi-Direct transceiver radio or interface, a Bluetooth™ Low Energy (BLE) transceiver radio or interface, an infrared (IR) transceiver, and/or any other wireless network transceiver radio or interface that allows the IoT device to communicate with a wide area network and with one or more other devices. In some embodiments, an IoT device does not include a cellular network transceiver radio or interface, and thus may not be configured to directly communicate with a cellular network. In some embodiments, an IoT device may include a cellular transceiver radio, and may be configured to communicate with a cellular network using the cellular network transceiver radio.

A user can communicate with IOT water sensor boards 102, 104, and 106 using an access device 108. Access device 108 can include any human-to-machine interface with network connection capability that allows access to a network. For example, in some embodiments, access device 108 can include a stand-alone interface (e.g., a cellular telephone, a smartphone, a home computer, a laptop computer, a tablet, a personal digital assistant (PDA), a computing device, a wearable device such as a smart watch, a wall panel, a keypad, or the like), an interface that is built into an appliance or other device (e.g., a television, a refrigerator, a security system, a game console, a browser, or the like), a speech or gesture interface (e.g., a Kinect™ sensor, a Wiimote™, or the like), an IoT device interface (e.g., an Internet enabled device such as a wall switch, a control interface, or other suitable interface), or the like. In some embodiments, access device 108 can include a cellular or other broadband network transceiver radio or interface, and can be configured to communicate with a cellular or other broadband network using the cellular or broadband network transceiver radio. In some embodiments, access device 108 may not include a cellular network transceiver radio or interface. While only a single access device 108 is shown in FIG. 5, one of ordinary skill in the art will appreciate that multiple access devices may communicate with IOT water sensor boards 102, 104, and 106. The user may interact with the IOT water sensor boards 102, 104, and/or 106 using an application, a web browser, a proprietary program, or any other program executed and operated by access device 108. In some embodiments, access device 108 can communicate directly with IOT water sensor boards 102, 104, and/or 106 (e.g., through a communication signal 116). For example, the access device 108 can communicate directly with IOT water sensor board 102, 104, and/or 106 using Zigbee™ signals, Bluetooth™ signals, WiFi™ signals, infrared (IR) signals, UWB signals, WiFi-Direct signals, BLE (Bluetooth Low Energy) signals, sound frequency signals, or the like. In some embodiments, access device 108 can communicate with the IOT water sensor boards 102, 104, and/or 106 via the gateways 110, blockchain 112 (e.g., through a communication signal 118) and/or via a cloud network 114 (e.g., through a communication signal 120). Call center personnel can access the gateway 110 to render assistance, such as confirming help prior to calling 911 if needed. In some embodiments, local area network 100 can include a wireless network, a wired network, or a combination of a wired and wireless network. A wireless network may include any wireless interface or combination of wireless interfaces (e.g., Zigbee™, Bluetooth™, WiFi™, IR (infrared, UWB, WiFi-Direct, BLE, cellular, Long-Term Evolution (LTE), WiMax™, or the like). A wired network may include any wired interface (e.g., fiber, ethernet, powerline ethernet, ethernet over coaxial cable, digital signal line (DSL), or the like). The wired and/or wireless networks may be implemented using various routers, access points, bridges, gateways, or the like, to connect devices in local area network 100. For example, local area network 100 can include gateway 110 and/or blockchain 112. Gateway 110 and/or blockchain 112 can provide communication capabilities to IOT water sensor boards 102, 104, 106 and/or access device 108 via radio signals in order to provide communication, location, and/or other services to the devices. In some embodiments, gateway 110 can be directly connected to external network 114 and can provide other gateways and devices in the local area network with access to external network 114. Gateway 110 can be designated as a primary gateway. While gateway 110 is shown in FIG. 1, one of ordinary skill in the art will appreciate that any number of gateways may be present within local area network 100. The network access provided by gateway 110 and/or blockchain 112 can be of any type of network familiar to those skilled in the art that can support data communications using any of a variety of commercially-available protocols. For example, gateways 110 can provide wireless communication capabilities for local area network 100 using particular communications protocols, such as WiFi™ (e.g., IEEE 802.11 family standards, or other wireless communication technologies, or any combination thereof). Using the communications protocol(s), gateways 110 can provide radio frequencies on which wireless enabled devices in local area network 100 can communicate. A gateway may also be referred to as a base station, an access point, Node B, Evolved Node B (eNodeB), access point base station, a Femtocell, home base station, home Node B, home eNodeB, or the like. In some embodiments, gateways 110 can provide access device 108 and/or IOT water sensor boards 102, 104, 106 with access to one or more external networks, such as cloud network 114, the Internet, and/or other wide area networks. In some embodiments, IOT water sensor boards 102, 104, 106 may connect directly to cloud network 114, for example, using broadband network access such as a cellular network. Cloud network 114 can include one or more cloud infrastructure systems that provide cloud services. A cloud infrastructure system may be operated by a service provider. In certain embodiments, services provided by cloud network 114 may include a host of services that are made available to users of the cloud infrastructure system on demand, such as registration and access control of IOT water sensor boards 102, 104, 106. Services provided by the cloud infrastructure system can dynamically scale to meet the needs of its users. Cloud network 114 can comprise one or more computers, servers, and/or systems.

A separate secure connection may be established by each IOT water sensor board 102, 104, 106 for communicating between each IOT water sensor board 102, 104, 106 and cloud network 114. A secure connection may also be established by access device 108 for exchanging communications with cloud network 114. In some examples, the secure connection may include a secure Transmission Control Protocol (TCP) connection. Gateway 110 can provide NAT services for mapping ports and private IP addresses of IOT water sensor boards 102, 104, 106 and access device 108 to one or more public IP addresses and/or ports. Gateway 110 can provide the public IP addresses to cloud network 114. Cloud network 114 servers can direct communications that are destined for IOT water sensor boards 102, 104, 106 and access device 108 to the public IP addresses. In some embodiments, each secure connection may be kept open for an indefinite period of time so that cloud network 114 can initiate communications with each respective IOT water sensor board 102, 104, 106 or access device 108 at any time. Various protocols may be used to establish a secure, indefinite connection between each of IOT water sensor board 102, 104, and 106, access device 108, and the cloud network 114.

Figure 6A:
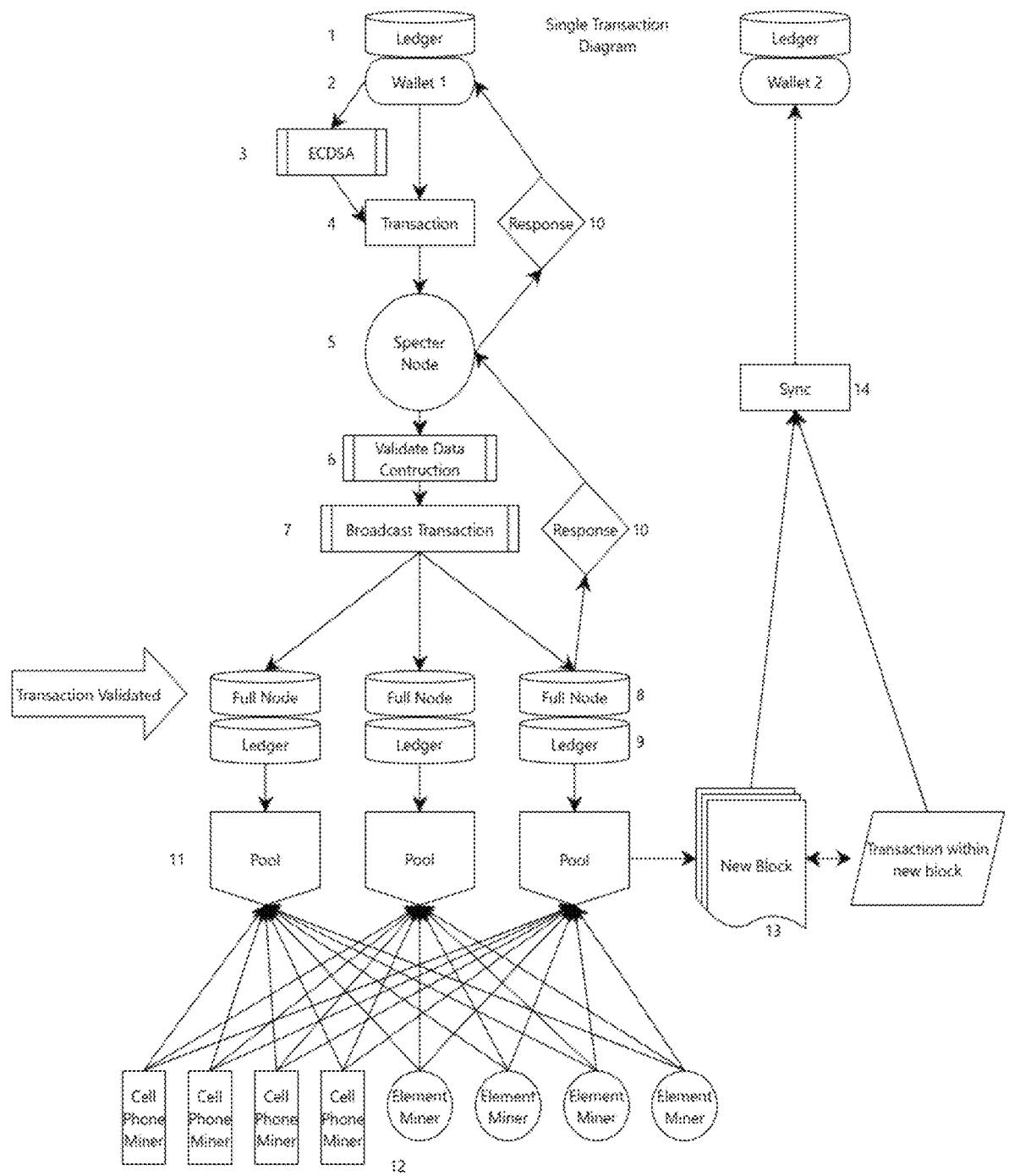
FIGS. 6A-6C show an exemplary blockchain network in the system of FIG. 5.
Figure 6B:
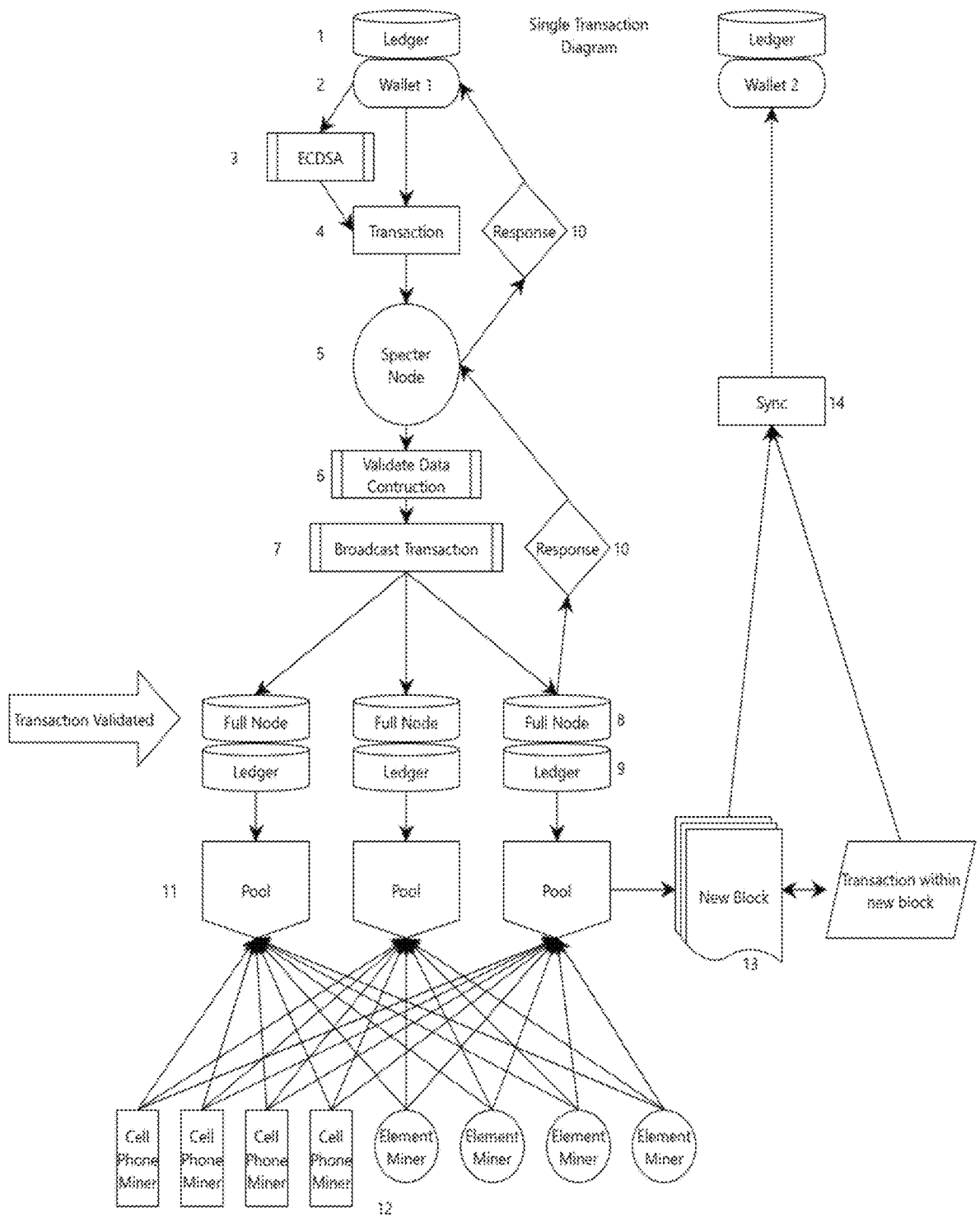
Figure 6C:
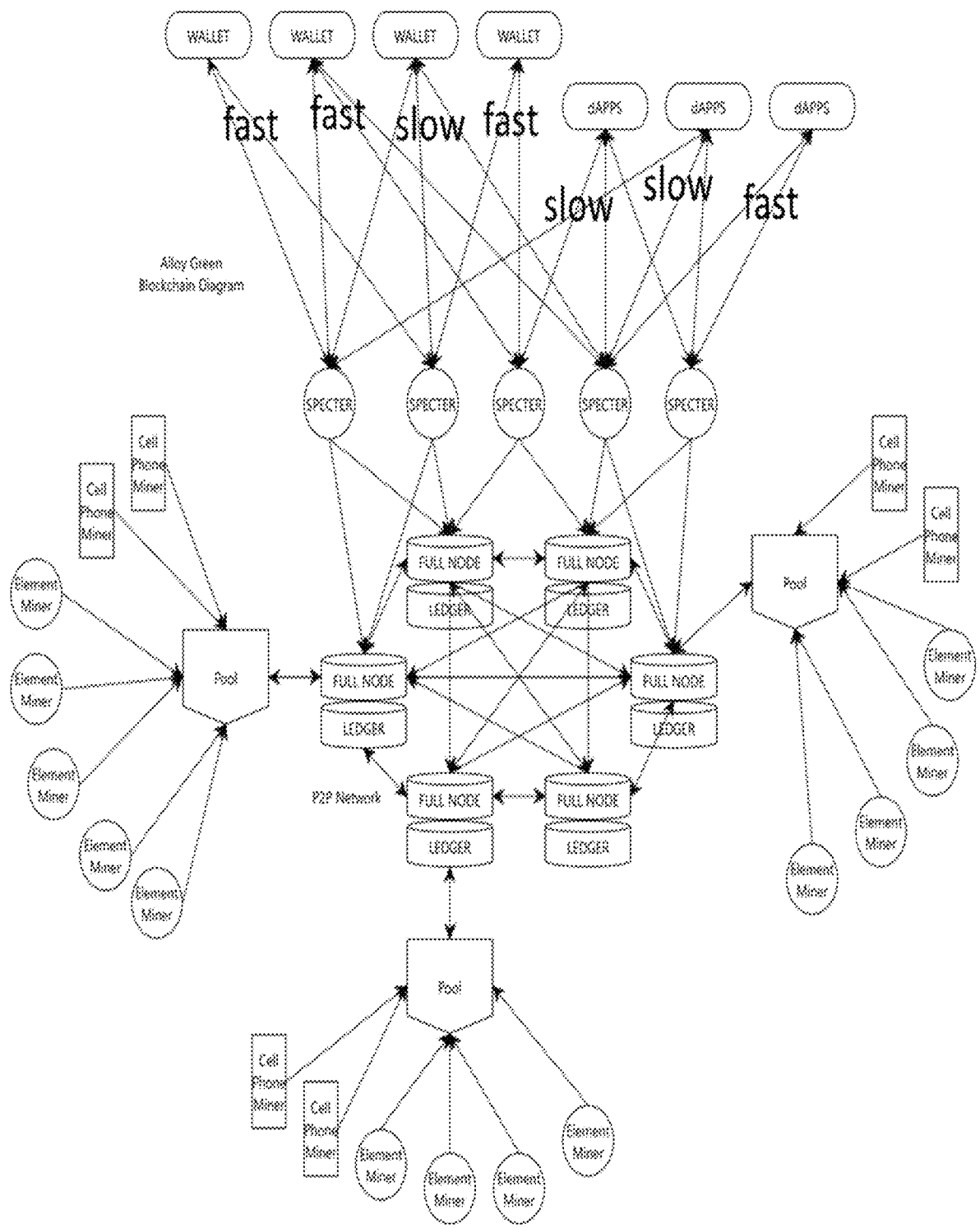

FIG. 6 shows in more details one exemplary low power consumption blockchain network used in the present systems. Designed with minimal electrical demand in mind without sacrificing blockchain performance and with enhanced security over traditional blockchains. The issue found was that the energy consumption of traditional blockchains continues to rise to exponential numbers. All while the world is collectively seeking to reduce overall demand on energy. By designing a blockchain with low energy consumption as a focus, the resultant blockchain technology is far superior to existing systems which rely on massive banks of graphics processors producing excessive heat and consuming many gigawatts of energy. Therefore, a new technology was required; Rather than the traditional Proof of Work method, the system uses Proof of Work Collaborative, wherein the miners share workloads across the network to reduce overall energy need by an order of magnitude. All while being faster and more secure than traditional blockchains.

In one aspect, the system is a fully functional blockchain which is operated in collaboration with its component elements, rather than competitively as are previous blockchain technologies. By design, this is a blockchain and cryptomining system which is highly efficient and due to that efficiency, reduces energy consumption of the blockchain or blockchains within the network or networks by considerable and notable amount. This lower energy requirement as a byproduct of allowing the network to operate on low power electronics or within electronics as a background function.

Multiple blockchains can share network workloads to further improve overall efficiency and speed. The blockchain can be fully decentralized across its network or networks. The blockchain can be fully centralized across its network or networks. The blockchain to operate as private, closed networks. The blockchain can operate as open, publicly accessed networks. The devices operating the network are low cost, low power hardware such as a microcontroller for the water sensors. The devices operating the network can be Internet of Things devices. The devices operating the network may be devices within appliances, sensors, drones, medical device, aerospace vehicles, or motor vehicles. The devices operating the network are part of another network sharing workload across multiple networks. The system can augment security system based on SHA-256 and SECP256K1. The system can establish a secure communication between two or more IoT type devices via blockchain. Wherein secure identification for each device is thoroughly checked with each communication within the network. The devices of the network or networks are components of one or more of one or more devices comprising in part or as a whole, from or contained within; dedicated devices, automobiles, locomotives, medical devices, household appliances, personal or non-personal digital devices, commercial or industrial devices, and/or devices within aircraft or watercraft.

The blockchain described here uses Proof of Work Collaborative (POW-C) technology. Where traditional blockchains use Proof of Work (POW) technology already, the POW-C system reduces both the energy required to process a transaction as well as the size of the devices within that blockchain that can operate the blockchain. This not only reduces the needs of electricity consumption but also the space used by many of the devices involved. This specifically benefits Internet of Things or IOT. And shows great promise in the IOT field. One implementation uses a device called a NodeMCU. It is a small, Arduino compatible controller chip designed for IOT.

One implementation operates as follows:
1. Wallet ledger: A copy of the ledger contained within the hardware or software wallet. Hardware wallets will be based on (NodeMCU) With memory card added.
2. Wallet: The result of the transactions related to the wallet address. Based on the (NodeMCU) and using an added memory card to store the ledger within a simple case.
3. ECDSA: Elliptic curves digital signature.
4. Transaction: The data that a wallet sends to the network which carries outputs from previous transactions and inputs for current transactions, in order to spend coins owned by the wallet, the wallet needs to sign the transaction to prove owner ship to the coins it is trying to spend, which is pretty similar to how Bitcoin and Ethereum and Litecoin.
5. Specter: A security miner that oversees the network prior to the full nodes distributing the workload to the Element Miners and Cell Miners. Also based on the (NodeMCU) hardware
6. Data Validation: Performed as part of the Specter's workload, verifying the data is in the correct format and without errors, it also makes sure the data is clean, no exploits or attacks. By performing this check, the system provides another layer of security for the users.
7. Broadcast Transaction: When the Specter is finished validating the data of the transaction, the transaction is broadcast to multiple full nodes.
8. Full Node: Receives the transaction from the Specter and validates the transaction's legitimacy and then passes the data to the mining pool for the miners. Full Nodes are based on the Raspberry Pi or compatible hardware and equipped with a screen to monitor traffic. The Full Nodes also have a storage card to store the ledger.
9. Full Node Ledger: Each Full node keeps a copy of the blockchain ledger on it's internal storage card. Storage cards are typically 32 gb Micro SD cards of class 10 speed.
10. Responses: When a transaction is received, the full node replies with a response to the Specter miner which passes the response to the wallet, the response either includes 'error' message, or 'ok' message which means the transaction was broadcast to the network successfully.
11. Pool: The mining pool, standard mining pool the same as mining pools for any other blockchain.
12. Miners: There are two types of miners. The first is the 'Element Miner' based on the NodeMCU hardware for minimal energy consumption. These are fitted to a simple protective case. The second type is 'mobile miners' based on a Cell Phone application. The miners perform the tasks of confirming transactions and finding new blocks.
13. Blocks: A block contains transactions and data, which is recorded in the ledger. This is the same as other blockchains.
14. Sync: The process of synchronizing the blockchain ledger across the network and updating ledger records of the completed transaction(s).

The system blockchain starts with the test network, which is similar to Bitcoin or Ethereum test network idea, where it is used to test implementations, before those implementations are eligible to deploy to the live network.

In the peer to peer network topology diagrams, a new type of miners is called Specter miner. The Specter miner is the security gateway for accessing the peer to peer network, as mentioned in the white paper, the system peer to peer network implements a fragmented decentralization model, which fragments the nodes into specific nodes, that carry specific functionalities, which if compared to Bitcoin, everyone knows that Bitcoin wallet software is all in one implementation, which means the same wallet can act as a client, and as a full node, as explained on Bitcoin.org On the other side, the system implements fragmentation, which divides the wallet software to a standalone client, and a standalone full node. This method allows inserting the Specter miners in between different nodes communicating on the network.

The client still downloads and synchronizes the complete ledger from the peer to peer network, and the full node also downloads and synchronizes the full ledger, but the client cannot operate as a full node, and the full node cannot operate as a client.

Following that structure, the result is a sophisticated specific protocol communication between all nodes on the network, and the Specter miners are the ones who verify the protocols and deploy the messages.

Following this topology, it appears that exploits arrive at a dead end, simply because the Specter miners do not carry an operating system, as in Linux or Windows or Mac, therefore no exploits have been implemented for those nodes.

The Specter miners act as servers and clients, and are hosted by the public, who buy the miners to receive coins from new blocks, therefore the Specter miners represent a decentralized network. The clients (simple wallets) communicate with the peer to peer network through the Specter miners, which means every request passing on the network is being filtered by the Specter miners before being passed on to the full nodes, this process includes digital signature generation from the Specter miners to be approved by the full nodes eventually. Therefore in case someone tries to send direct exploits to the full nodes, his sockets will be missing the digital signature, or carry a rejected signature.

The full nodes are not vulnerable either, they carry their own security enhancement, which filters data and prevents buffer overflows, full nodes also work based on a protocol specific communications, where they do not accept any socket without the proper protocol headers. Fragmented decentralization is a partial key for enhanced security levels, compared to Bitcoin and other networks. The core of the peer to peer network is the full nodes, just like in Bitcoin and Litecoin, because the full nodes accept synchronize requests and help broadcasting transactions. Therefore, protecting the full nodes from being exploited is one feature that the present blockchain implements. In consensus is a famous term, that people understand about full nodes in a blockchain industry which means the full nodes carry the same ledger at least minus current block.

The system confirms whether a Full Node is in consensus with the rest of the network or not, because the miners query random Full Nodes at certain situations, and the answers from the full nodes need to match each other in order to be considered in consensus. An example to explain this topology is when a Full Node replies with UXTO for a wallet, that is different from other Full Nodes replying for the same wallet, the system blockchain implements verification levels that calculate how many Full Nodes voted yes, and how many voted no, and the result of accuracy and correctness needs to be above 93% in order for a transaction to confirm. Therefore, the system does not fall under the 51% attack, because there is a new role for measuring decisions on the network.

Pseudo codes and detailed explanation for functions and processes

Peer to Peer Client Wallet
On application start
If ('wallet.dat' file does not exist)
{
Show the sign up interface;
}
Else
{
Show the login interface;
}
Both sign up interface and login interface include 6 input fields for the SEED
Signup interface
Login interface
Sign up interface active:
Create a new wallet
If (word1 of SEED and word2 and word3 and word4 and word5 and word6 have minimum length of 8 characters )
{
Check if the different words are unique among each other by calling the check duplicates function;
}
Function checkduplicates (array of strings)
{
Create a new list of strings;
Create a Boolean and set its value to false;
Loop through the input array of strings;
Check if the list of strings contains the value in the array of strings during loop
If (list contains value)
{
Turn Boolean to true;
Break the loop;
}
Add the value to the list;
Return the Boolean;
}
When receiving a result from the checkduplicates function, the Boolean will x indicate the uniqueness of each word in the SEED entered by the user.
If (word1 and word2 and word3 and word4 and word5 and word6 is unique)
{
Hash each word separately to a SHA256 hash;
}
Function SHA256(string)
{
Take the input string into a variable;
Generate SHA256 for the input string;
Return the SHA256 result of the input string;
}
As a result for the previous hashing operation, all 6 words of the SEED have been hashed individually
The next step:
Create a new string;
newString = SHA256(SHA256(word1)+ SHA256(word2)+ SHA256(word3)+ SHA256(word4)+ SHA256(word5)+ SHA256(word6));
This new string is the hash of concatenated double hashed words of the SEED.
The next step is as follows:
For loop (for the number of characters in word6 of the SEED)
{
newString = SHA256(newString);
}

The previous loop hashes the newString for a number of times of how many characters are in the word6 of the SEED.

The newString was already a hash of concatenated double hashed words of the SEED. Then the code creates another string which the hash of the hashed word6 is +word5+word4, this is the second half of the SEED but reversed, and hashed.

secondString=SHA256(SHA256(word6)+SHA256(word5)+SHA256(word4));

The next step is to assign the time stamp to variables.

Date=current date in the system;

Time=current time in the system;

Note, the date and time are used in randomizing the coefficient of the equation, and it does not matter how accurate or correct they are.

The next step is to assign a balance of 0 coins

Balance="0.00000000";

After the previous steps the code makes a modification to the secondString that was created earlier.

```
secondString = SHA256(secondString + SHA256(date)+ SHA256(time) + randomstring( ));
function rondomstring( )
{
create ASCII characters in a variable;
create a char[100]
create a simple random number generator;
loop through the length of the char array
{
Append a random character;
}
Convert the char array to a string;
Return the string;
}
```

The next step is to generate the private key, which is done using a random number generator, that is a mix of rolling dice and capturing random pixels off of the screen of the computer, a very close mechanism as in bitaddress.org After the private random key is generated, it goes through the famous public key generation using elliptic curves, that is published on Bitcoin documentation, and is also used by Litecoin and plenty other coins.

From the public key, the 32 bit address is generated by following the same steps as Bitcoin again.

At this point the code is ready to create the initial string, which will be encrypted using AES encryption and saved in the wallet.dat file Initialstring=privatekey+newString+secondString;

Then the AES encryption function is initialized, and it relies on the newString and the secondString to encrypt the data stored in the file.

```
Function encrypt( )
{
Check if the newString is empty and display an error if true;
Call the Rijndael managed function by sending the (newString);
Receive the encrypted string from the function
Use the string to encode the initial string
}
Function Rijndael managed (string)
{
Receive the input string and use it as a salt;
The password is the secondString;
The salt and the key are used to apply the AES encryption;
}
```

The result of the above operations is an encrypted file content, which is AES ecrypted based on the newString and the secondString.

Therefore in order to decrypt the file, someone must have the exact 6 SEED words, and in order to brute force the SEED there are multiple steps to break, and that is not easy to accomplish.

At this point the wallet has prepared a new wallet.dat file content, which is encrypted and contains the private key.

```
Function restort( )
{
Create wallet.dat file;
Write the encrypted initialstring to the wallet.dat file;
}
The next step is to call the login function.
Function login ( )
{
Modify the interface layout;
Hide contents;
Show other contents;
Call ledger function;
}
Function ledger ( )
{
Check if ledger.dat file exists;
If (ledger.dot exists)
{
Exit;
}
Else
{
Create ledger.dat file;
}
}
```

Next step is to start a new thread, that works in the background of the application.

The thread is dedicated to synchronize the ledger from the blockchain, and update the wallet variables based on the readings, and parsing of the blocks contents.

The thread run in a loop, which repeats itself with a delay.

The first step before starting the loop is to get the network height.

In order to get the network height the wallet needs to identify valid peers which it can connect to and ask information.

The peers on dynamic ip addresses, unless some peers have static ip address, but in both cases the same process to discover peers apply.

If it is the first time for the wallet to run, it means it does not carry any history for peers ip addresses on the network, therefore it will need to connect to the DNS tracker, to get a list of peers, then it can query the peers for their known peers and does not need to connect to the DNS tracker again.

If it is not the first time for the wallet to run, then it will carry history of peers in its data storage, and it can use this list to connect to any peer and retrieve new peers from it.

In case all peers in the list history are down, then the wallet will query the DNS tracker for a fresh list and carry on from there.

```
Function peers( )
{
Check wallet storage for peers list;
If (no list found)
```

```
{
Connect to DNS tracker;
Collect list;
Add list to storage;
}
If (list found)
{
Loop through the list to find alive peers;
If (alive peers are found)
{
Reguest fresh peers list;
Updat4e peers list in storage;
Reguest network height;
}
Else
{
Connect to DNS tracker and request a fresh peers list;
}
}
}
```

Once the peers list is populated, and the network height is retrieved, the wallet is ready to synchronize the ledger.

```
Function synchronize ( )
{
Loop through peers list
{
Try to connect to live peer;
If connected
{
Send protocol specific message requesting ledger synchronizing;
Receive response from peers;
Parse response;
Extract network height;
Parse the block list received from the peer;
Insert the data into wallet storage;
Parse the blocks content and headers;
Verify correctness of block headers to follow the chain rules;
Update wallet balance and transactions history based on the data flow;
}
}
}
```

The previous process runs over and over within the loop and does not interfere with the wallet layout functionality because it is on a secondary thread running in the background.

The delay factor changes based on the difference between the network height and the wallet height, if the range is large the delay factor decreases, while if the range is small the delay factor increases relatively.

This feature keeps the network less busy, and saves resources, since the synchronized wallets do not have to send as many requests as the new wallets or unsynchronized wallets.

Therefore when a wallet reaches a good amount of synchronizing which makes it considered an up to date wallet, and that would happen if network height−wallet height<2 or 3

At this level the wallet will slow down on querying the network and investigating new peers, which allows more resources for other wallets where for example network height−wallet height>50,000

If the network height−wallet height is a large difference then the wallet will keep the delay factor small in order to catch up on the blocks it is missing.

Therefore the relationship between the delay factor and the difference between the network height and wallet height is inversely proportional. Yet the delay factor does not increment or decrement gradually, on the contrary, it increments suddenly, or decrements suddenly based on the if condition that is investigated every time the loop completes a cycle.

The relation ship between the delay factor and the level of synchronization of the wallet, has a direct effect on the traffic over the peer to peer network.

In the following diagram the wallets with slower queries and slower traffic show saving resources on the network, to allow other wallets to query fast synchronization until they reach the same level of saturation as the slowed down wallets.

Login interface active:

Login the existing wallet.dat file

In case on application startup a wallet.dat file exists, the application will initiate the login interface and will request the correct 6 SEED words to access the current wallet.dat file.

Once the user inserts the 6 words of SEED and click the login button, the application will use the SEED words to perform the hashing steps and then calls the decrypt function

```
Check duplicate;
Hash SEED words separately using SHA256( );
Generate the newString;
Generate the secondString;
Function decrypt ( )
{
Using the newString and the secondString decrypt the contents of the wallet.dat file;
If the salt and cypher generate correctly and a successful decryption takes place:
    Authorize and initiate the access function;
If the encryption fails:
    Reject, and prompt user that the SEED is incorrect;
}
```

If a successful login is in place, the wallet extracts the private key into a string, then it uses the private key to generate the public key and wallet address.

The application disposes the strings for the private key and public key, and only keeps the wallet address that is 32 characters long.

This way the privatekey is only carried in the device memory for an instance to derive the public key Then the public key stays for another instance, to derive the wallet address, and both key are removed instantly from the device RAM.

During synchronization the wallet only need the wallet address.

Such a technique allows the wallet to keep the private key encrypted even while running.

The same conditions apply to the SEED words and any critical information where the wallet can replace the SEED words with the newString and secondString, which are SHA256 variables.

Then once the wallet address is retrieved the wallet can empty all the strings and variables instantly and keep their value empty in the device RAM When sending a transaction the wallet needs to identify the private key to sign the transaction by using ecdsa signature, at this point the wallet needs to decrypt the wallet.dat file again to access the private key.

There are two different implementations that have been adopted in the Alloy Green wallets, one of them is to keep the first three words of the hashed SEED in the device memory, and dispose the other half of the SEED, after login, and when a transaction is required the user has to input 3 words of the SEED.

Another implementation in a different version of the wallet keeps an encrypted form of some words from the SEED in the memory after login, and prompts the user for less words when attempting a transaction.

Yet in both cases the wallet eliminates storing variables in the device memory, that allow retrieving the decryption parameters, which are hashes of the words of the SEED in certain orders and certain combinations as explained earlier.

Updating wallet balance

Synchronizing the open ledger allows the wallet to parse the block contents and retrieve the transactions related to the wallet.

Any new block downloaded must have a matching previous blockhash to the previous block hash.

The wallet extracts the transactions and shows notification on the operating system alerting the user of incoming transaction.

The adopted mechanism is very similar to the one in Bitcoin, Litecoin, and other coins, which seems to be the most suitable adoption to the subject.

On exiting the wallet, the wallet attempts to clear any variables it had in the device memory and were necessary while the wallet running.

The system implements enhanced features to filter every socket transferred on the network, this filtering of data enhances the network security overall. Wallets are also secured within, every wallet (client) acts as a standalone banking system, the wallet.dat file is where the WIF is stored, yet it is encrypted, and the whole wallet.dat file is always encrypted, the encryption is based on AES Rijndael, and the SEED is involved within the encryption, the user decides upon the SEED, which means that even if the user lost his laptop or left it unlocked at school or work, or a public place, and someone tried to steal his wallet.dat file, the hacker is still up against decrypting AES which is not a simple or easy task to perform, especially that the SEED contains 6 words, and each word has to be unique from the other 7 words, and least 8 characters, then sha256 is applied to the SEED words, and different combinations and divisions of the sha256 happen before the calculations of the AES encryption take place.

SHA256 is a one-way hash function, therefore guessing the SEED and breaking the AES is not an easy task to achieve. Elliptic curve SECP256K1 is another strong cryptography area implemented in the The system blockchain, which is just like other cryptocurrencies, Bitcoin, Ethereum, Litecoin . . . etc. ECDSA is another implementation which is famous in the industry and is used by The system blockchain to sign transactions.

Fragmentation makes it more difficult for hackers to run exploits, because there are more nodes on the peer to peer network, and the nodes carry different functions from other nodes, when this is compared to Bitcoin network, and how it is all in one software, you can notice the difference between the security level of each network.

Proof of work collaborative, allows all miners participating in the network to solve the equations together, confirm transactions together, and find new blocks together, without having to compete, therefore each participant can carry any small piece of the equation without having to worry about competing with another participant, and in return the participant gets rewarded based on the amount of work calculated by his miner(s).

Proof of work collaborative aims towards more decentralization, and more fragmentation, when compared to usual proof of work, where a Bitcoin single mining farm can control almost 50% of the network, by producing and selling ASIC miners, this takes the network towards centralization instead of decentralization, while in The system blockchain the new concept of proof of work collaborative prevents that incident, because all miners combine their work and calculations, and there is no competition among them, therefore wasted work and wasted calculations has decreased by a very large amount compared to the usual proof of work model.

The more miners the faster the network, is because the Specter miners are the gateways between the clients and the Full Nodes, and the more Specter miners exist on the network, the more ability of digesting more transactions per second.

On the same page, the element miners and cellphone miners, play a good role in speeding the network by confirming transactions faster and hashing faster.

The full nodes also play a good role, where more full nodes mean more resources on the network and faster transactions. Therefore the network scales by adding more miners, and full nodes, which is a usual case for any peer to peer network. In one embodiment, the network will start at 1,000 transaction per second, and scale up to 10,000 transactions per second. At that level, when a block target is 30 seconds, it means the network can digest 300,000 transactions per block, compared to Bitcoin, a block takes about 10 minutes and holds and average of 2,000 transactions per block.

Scaling is also involved in different sides of the DAPPS, and the network is built to scale gradually based on expanding the nodes and the miners. DAPPS are not all concerned about speed, some DAPPS are concerned about storage size more than speed, others are concerned about speed and not the storage, and some are concerned about both.

The blocks in the system blockchain do not just carry transactions, but also carry data, the data is from various industries using the blockchain as a proof of operation. The data logged by the equipment is verified by the Specter miners to underlie specific DAPPs categories. Data transferred by industrial equipment carry digital signature based on ECDSA to confirm identity and therefore confirm sincerity of the data logged into the blocks and the open ledger. The system is not just a coin blockchain, but a blockchain that implements DAPPS and supports industrial equipment to log data history in the open ledger, where such data is signed to verify the industrial equipment and differentiate machinery by ID.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

One embodiment can be a cryptographic wireless Key for Automobile. When using a wireless remote to control the keyless entry and the ignition start for a car or truck, any hacker can sniff packets from the air, that were sent by the wireless key and copy the valid commands and repeat them to mess with the automobile. The communication between the sender and the recipient unit is protected by a new level of cryptography which involves symmetric and asymmetric encryptions, it also involves enhanced algorithms that prevent intruders and hackers from being able to duplicate a radio signal that was sent from the legitimate automobile wireless key and try to send it as it was (duplicate) in an attempt to mess with the automobile recipient unit. The term cryptographic means applying a digital signature based on ECDSA for example or an RSA. Taking an example of the ECDSA based on elliptic curves digital signature and Diffie Hellman key exchange, the commands sent from the automobile wireless key to the recipient unit will carry a digital signature, in addition to this, a new level of enhancement is being applied to prevent a hacker from copying a command including a correct digital signature and trying to repeat it and mess with the recipient unit, this new level is based on an algorithm which does not allow using the same random key for a digital signature twice, therefore the parameters for the digital signature (r,s) will always be different for the digital signature because the sender (automobile wireless key) and the receiver (automobile receiving unit) will keep track of which (r) has been used before and will not permit re-using the same (r). If the automobile wireless key will send a command every second, it means it will send 31,536,000 commands per year, and it uses the secp192r1 curve which is one of the smallest elliptic curves it means there is 1990455902900393443631338604517905383086743862399980 years left to run a command with a new signature every second.

Similarly, the blockchain can be used to control a wireless thermostat or a Wi-Fi thermostat to control an air conditioner unit or a heat pump or a boiler, the blockchain is used to prevent any hacker from sniffing packets from the air, that were sent by a wireless thermostat or a Wi-Fi thermostat and copy the valid commands and repeat them to mess with the recipient unit.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. A memory and a processor may be discrete components of a network entity that are used to execute an application or set of operations as described herein. The application may be coded in software in a computer language understood by the processor, and stored in a computer readable medium, such as, a memory. The computer readable medium may be a non-transitory computer readable medium that includes tangible hardware components, such as memory, that can store software. Furthermore, a software module may be another discrete entity that is part of the network entity, and which contains software instructions that may be executed by the processor to effectuate one or more of the functions described herein. In addition to the above noted components of the network entity, the network entity may also have a transmitter and receiver pair configured to receive and transmit communication signals (not shown). In some embodiments, a cloud computing system may be provided for communicating with one or more sensing devices. The cloud computing system can analyze pressure data provided from a sensing device, and can determine or verify occurrences of leaks and can characterize the leaks.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application. One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A system to characterize water in a building, comprising:
    a microcontroller;
    a water sensor coupled to the microcontroller to handle a lightweight blockchain, and when idled the microcontroller mines a cryptocurrency;
    a water valve coupled to the microcontroller; and
    an encryption module executed by the microcontroller to secure water data; and
    a transceiver to communicate secured water data over a network to a remote processor, wherein the microcontroller makes air characteristic entries on a blockchain with Proof of Work Collaborative (POW-C) with a wallet ledger where result of the transactions are coupled to a wallet address, wherein the controller applies elliptic curve digital signature, and wherein the controller communicates with a security miner that oversees the network prior to one or more full nodes distributing workload to the other miners.

2. The system of claim 1, comprising a blockchain coupled to the microcontroller through the transceiver.

3. The system of claim 2, wherein sensor data is stored in the blockchain to avoid tampering.

4. The system of claim 1, wherein data transactions sent by the microcontroller are signed with elliptic curve signature.

5. The system of claim 1, comprising an application program interface (API) to allow a mobile device to query the microcontroller for water data.

6. The system of claim 5, wherein the microcontroller receives commands from a phone app to the devices and communicate readings from the devices to the phone app using the API.

7. The system of claim 5, wherein the microcontroller uses the API to communicate an email or a text notification based on a predetermined event.

8. The system of claim 5, wherein the microcontroller uses the API to communicate an email or a text notification based on water leakage detection.

9. The system of claim 5, comprising an API gateway, wherein communications between network devices and the blockchain enhanced security features that protect the connections and the privacy of the users.

10. The system of claim 1, comprising code to automatically turn off the water valve in case of a leak.

11. The system of claim 1, comprising a learning machine to disaggregate individual water usage from the total water consumption at an appliance or fixture level.

12. The system of claim 1, comprising a call center in communication with the microcontroller and code to monitor activities of life from water sensor data and request assistance.

13. The system of claim 1, wherein the encryption does not allow using the same random key for a digital signature twice and wherein encryption parameters for a digital signature (r,s) are different for the digital signature because a sender and a receiver track and reject re-using the same (r).

14. A method to manage water in a building with an appliance, comprising:
    reading from one or more sensors water flow into the building;
    storing sensor data on a lightweight blockchain requiring just a microcontroller;
    determining if the water flow is from a leakage above a predetermined threshold and shutting off water into the building and when the microcontroller is idled, mining for a cryptocurrency, wherein the microcontroller makes air characteristic entries on a blockchain with Proof of Work Collaborative (POW-C) with a wallet ledger where result of the transactions are coupled to a wallet address, wherein the controller applies elliptic curve digital signature, and wherein the controller communicates with a security miner that oversees the network prior to one or more full nodes distributing workload to the other miners.

15. The method of claim 14, comprising notifying a user of the water leakage prior to shutting off water into the building.

16. The method of claim 14, comprising communicating with a mobile device through an encrypted application program interface (API).

17. The method of claim 14, comprising securing communications with an elliptic curve signature.

18. The method of claim 14, comprising applying the cryptocurrency to offset the cost of the appliance.

19. The method of claim 14, comprising monitoring activities of life from sensor data and calling for assistance if needed.

* * * * *